(12) United States Patent
Sato et al.

(10) Patent No.: US 10,497,339 B2
(45) Date of Patent: Dec. 3, 2019

(54) DISPLAY APPARATUS AND NON-TRANSITORY COMPUTER READABLE MEDIUM

(71) Applicant: FUJI XEROX Co., Ltd., Tokyo (JP)

(72) Inventors: Masahiro Sato, Kanagawa (JP); Kengo Tokuchi, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 2 days.

(21) Appl. No.: 15/487,646

(22) Filed: Apr. 14, 2017

(65) Prior Publication Data

US 2018/0130448 A1 May 10, 2018

(30) Foreign Application Priority Data

Nov. 7, 2016 (JP) .................................. 2016-217502

(51) Int. Cl.
| | | |
|---|---|---|
| *G09G 5/14* | (2006.01) | |
| *G06F 1/16* | (2006.01) | |
| *G09G 5/00* | (2006.01) | |
| *G06F 3/147* | (2006.01) | |
| *G09G 3/00* | (2006.01) | |

(52) U.S. Cl.
CPC ............. *G09G 5/14* (2013.01); *G06F 1/1641* (2013.01); *G06F 1/1652* (2013.01); *G06F 1/1677* (2013.01); *G06F 3/147* (2013.01); *G09G 3/00* (2013.01); *G09G 5/003* (2013.01); *G09G 2320/08* (2013.01); *G09G 2340/0464* (2013.01); *G09G 2380/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,502,788 B2 * | 8/2013 | Cho | ...................... | G06F 1/1626 |
| | | | | 345/173 |
| 8,947,462 B2 * | 2/2015 | Joo | .......................... | G09G 3/20 |
| | | | | 345/661 |
| 8,970,455 B2 * | 3/2015 | Thorson | .................. | G06F 3/147 |
| | | | | 345/105 |
| 9,317,067 B2 * | 4/2016 | Choi | ...................... | G06F 1/1677 |
| 9,344,672 B2 * | 5/2016 | Lee | ...................... | H04M 1/0202 |
| 9,639,175 B2 * | 5/2017 | Cho | ....................... | G06F 1/1652 |
| 9,678,582 B2 * | 6/2017 | Kwak | ................... | G06F 3/0487 |
| 9,818,370 B2 * | 11/2017 | Joo | ........................... | G09G 3/20 |
| 2008/0291225 A1 * | 11/2008 | Arneson | .................. | G06F 3/011 |
| | | | | 345/698 |
| 2013/0222207 A1 * | 8/2013 | Baek | ......................... | G06F 5/00 |
| | | | | 345/1.1 |

(Continued)

FOREIGN PATENT DOCUMENTS

JP    2014-161009 A    9/2014

*Primary Examiner* — Motilewa Good Johnson
(74) *Attorney, Agent, or Firm* — Sughrue Mion, PLLC

(57) ABSTRACT

A display apparatus includes an image display that displays a display screen that is transformable in shape at an arbitrary location, a detecting unit that detects an overlap region where one region of the display screen, when transformed, overlaps another region of the display screen, and an executing unit that performs a predetermined process if the detecting unit has detected the overlap region between the one region and the other region of the display screen.

17 Claims, 14 Drawing Sheets

(56) References Cited

U.S. PATENT DOCUMENTS

| | | | |
|---|---|---|---|
| 2014/0015743 A1* | 1/2014 | Seo | G06F 1/1694 |
| | | | 345/156 |
| 2014/0035869 A1* | 2/2014 | Yun | G06F 3/0414 |
| | | | 345/174 |
| 2014/0062976 A1* | 3/2014 | Park | G09G 5/00 |
| | | | 345/204 |
| 2014/0226275 A1 | 8/2014 | Ko et al. | |
| 2016/0132074 A1* | 5/2016 | Kim | G06F 1/1652 |
| | | | 715/769 |
| 2016/0259514 A1* | 9/2016 | Sang | G06F 3/04817 |
| 2017/0365229 A1* | 12/2017 | Kwa | G09G 5/003 |
| 2018/0088699 A1* | 3/2018 | Dao | G06F 3/044 |

* cited by examiner

DISPLAY APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-217502 filed Nov. 7, 2016.

BACKGROUND

(i) Technical Field

The present invention relates to a display apparatus and a non-transitory computer readable medium.

(ii) Related Art

An image display screen that is transformable in shape at an arbitrary location may be presented in an image display unit of a display that displays an image. Even if the display screen is transformed, a predetermined process may not be performed on the display, and transformation of the display screen has not been utilized.

SUMMARY

According to an aspect of the invention, there is provided a display apparatus. The display apparatus includes an image display that displays a display screen that is transformable in shape at an arbitrary location, a detecting unit that detects an overlap region where one region of the display screen, when transformed, overlaps another region of the display screen, and an executing unit that performs a predetermined process if the detecting unit has detected the overlap region between the one region and the other region of the display screen.

BRIEF DESCRIPTION OF THE DRAWINGS

Exemplary embodiment of the present invention will be described in detail based on the following figures, wherein.

DETAILED DESCRIPTION

An exemplary embodiment of the present invention is described in detail with reference to the attached drawings.

Figure 1:
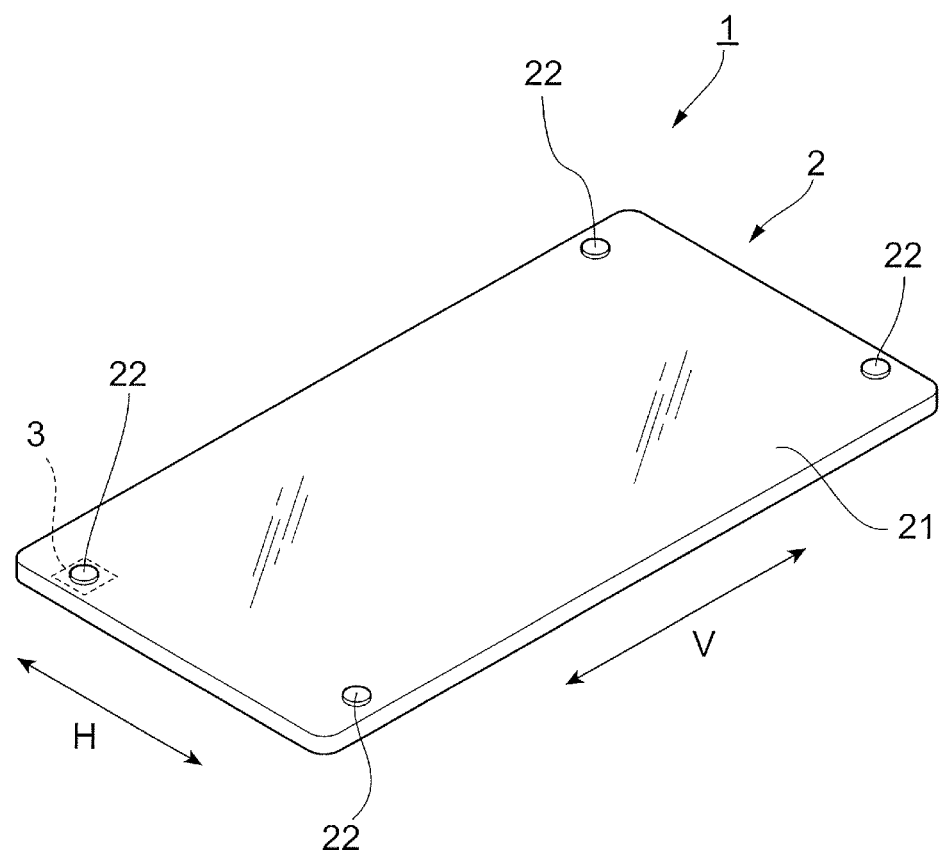
FIG. 1 generally illustrates a terminal apparatus of an exemplary embodiment.

FIG. 1 generally illustrates a terminal apparatus 1 of the exemplary embodiment. FIG. 2A through FIG. 2D and FIG. 3A through FIG. 3D illustrate forms into which the terminal apparatus 1 is transformed in shape.

Referring to FIG. 1, the terminal apparatus 1 as an example of a display apparatus includes an image display 2 that displays an image, and a controller 3 that generally controls the terminal apparatus 1.

In accordance with the exemplary embodiment, the longitudinal direction of the terminal apparatus 1 of FIG. 1 represents a vertical direction V, and the direction perpendicular to the longitudinal direction of the terminal apparatus 1 represents a horizontal direction H.

The image display 2 includes a display screen 21 that displays an image and operation units 22 that acts on the display screen 21.

The display screen 21 functions as a touchpanel. An organic electroluminescent (EL) display may work as the display screen 21.

The display screen 21 of the exemplary embodiment is bendable and foldable.

Figure 2A:
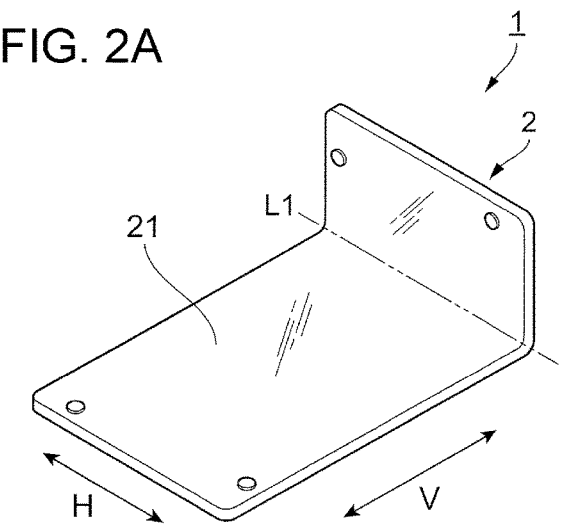
FIG. 2A through FIG. 2D illustrate forms into which the terminal apparatus is transformed in shape.
Figure 2B:
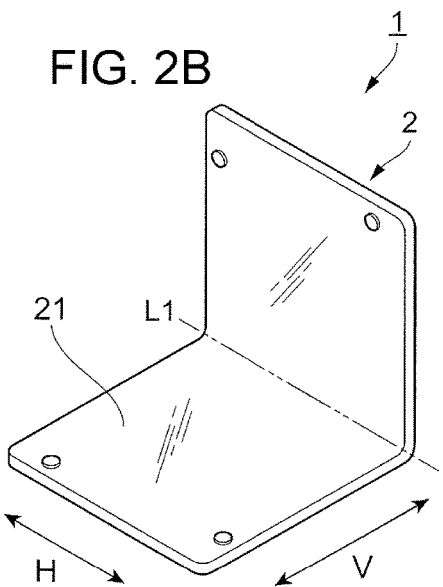
Figure 2C:
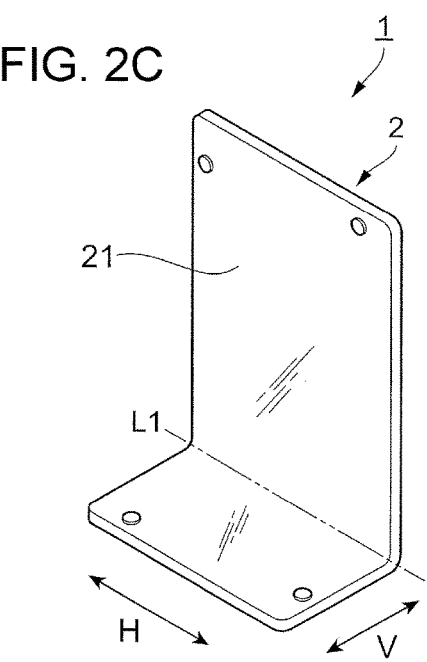
Figure 2D:
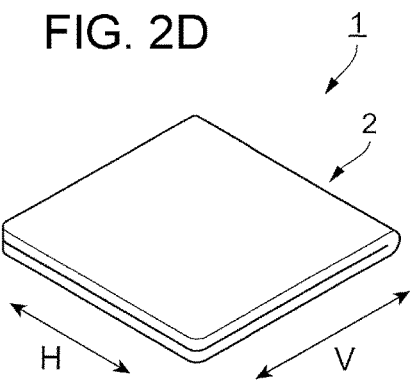

Referring to FIG. 2A through FIG. 2C, the display screen 21 may be bent into half along a border line L1 serving as a fold line extending in the horizontal direction H at an arbitrary location perpendicular to the vertical direction V of the display screen 21 (vertically bent along a horizontal fold line). In accordance with the exemplary embodiment, the display screen 21 may be bent along the border line L1 serving as a horizontal fold line at an arbitrary location perpendicular to the vertical direction V of the display screen 21. The display screen 21 that is bent along the horizontal fold line may be folded as illustrated in FIG. 2D.

Figure 3A:
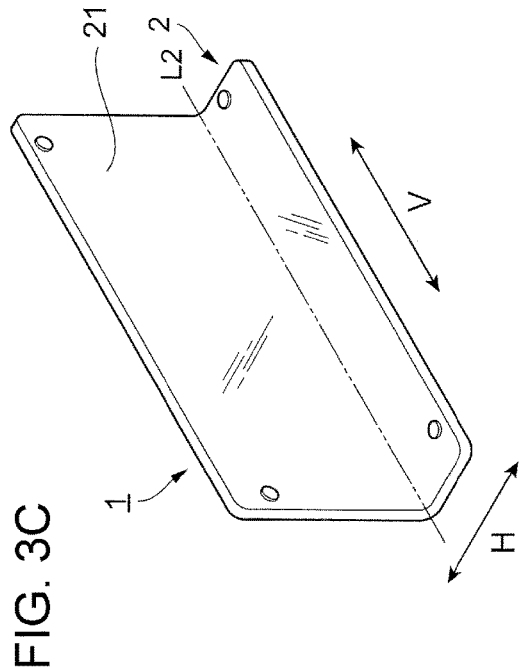
FIG. 3A through FIG. 3D illustrate forms into which the terminal apparatus is transformed in shape.
Figure 3C:
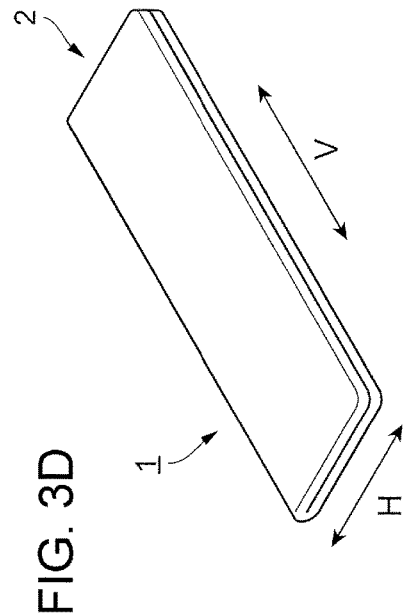
Figure 3B:
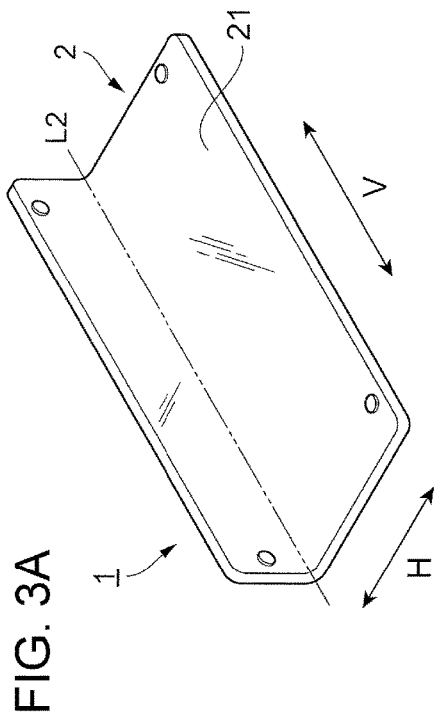
Figure 3D:
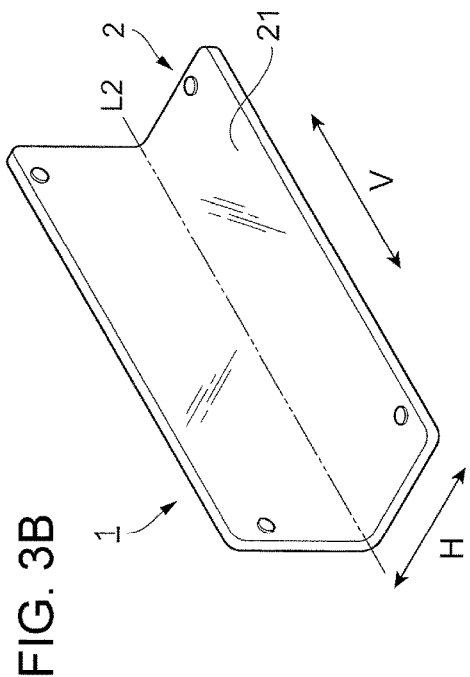

Referring to FIG. 3A through FIG. 3C, the display screen 21 may be bent into half along a border line L2 extending in the vertical direction V (horizontally bent along a vertical fold line) at an arbitrary location perpendicular the horizontal direction H of the display screen 21. In the same way as the vertical folding, the display screen 21 may be bent along the border line L2 serving as a vertical fold line at any location perpendicular to the horizontal direction H of the display screen 21. The display screen 21 that is bent along the vertical fold line may be folded as illustrated in FIG. 3D.

The operation unit 22 of FIG. 1 is manufactured of an electrically conductive resin. Four operation units 22 are respectively arranged at four locations. More specifically, each operation unit 22 is arranged at each of the four corners of the display screen 21.

Each operation unit 22 is slightly projected from the display screen 21. When the display screen 21 is folded, the operation unit 22 contacts part of the display screen 21. Specific structure and location of the operation unit 22 are described in detail below.

In accordance with the exemplary embodiment, when the display screen 21 is folded, the operation unit 22 is pressed into contact with part of the display screen 21, and the location where the operation unit 22 pressed into contact with the display screen 21 is detected. When the display screen 21 is folded, part or whole of the region of the display screen 21 overlaps each other (see FIG. 2D and FIG. 3D). In accordance with the exemplary embodiment, an overlap region of the display screen 21 is calculated in accordance with the location where the operation unit 22 is pressed into contact with the display screen 21.

In accordance with the exemplary embodiment, if one region of the display screen 21 overlapping another region of the display screen 21 is detected, the terminal apparatus 1 performs a predetermined process. More specifically, the terminal apparatus 1 performs the predetermined process (hereinafter referred to as a process-at-folding) when the display screen 21 is folded. The specific contents of the process-at-folding are described in detail below.

Figure 4:
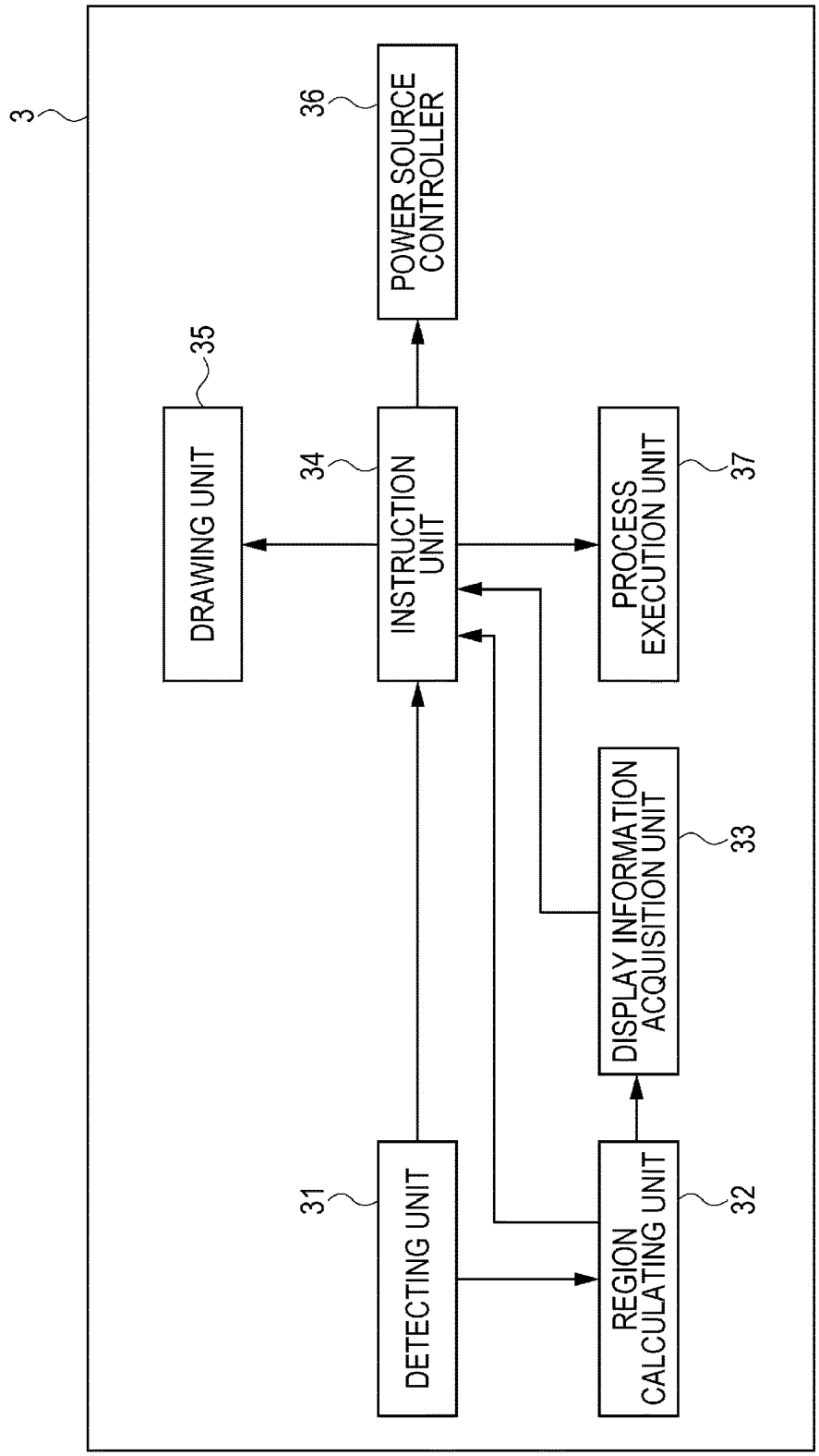
FIG. 4 is a functional block diagram illustrating a controller that performs a process-at-folding.

FIG. 4 is a functional block diagram illustrating the controller 3 that performs the process-at-folding.

The controller 3 includes a detecting unit 31 that detects a location where the operation unit 22 is pressed into contact with the display screen 21, and a region calculating unit 32 that calculates a region where the display screen 21 overlaps each other. The controller 3 further includes a display information calculating unit 33 that acquires information related to an image displayed on the overlap region of the display screen 21, a instruction unit 34 that indicates contents of the process-at-folding, and a drawing unit 35 that controls an image displayed on the display screen 21. The controller 3 further includes a power source controller 36 that controls the power source of the terminal apparatus 1, and a process execution unit 37 that performs a variety of operations in the process-at-folding.

The detecting unit 31 detects the location where the operation unit 22 is pressed into contact with the display screen 21 in accordance with a location where a voltage or an electrostatic capacitance of the display screen 21 changes when the operation unit 22 is pressed in contact with the display screen 21.

The region calculating unit 32 calculates the region where portions of the display screen 21 overlap each other (hereinafter referred to as an overlap region) in accordance with the location where the operation unit 22 is pressed in contact with the display screen 21.

The display information calculating unit 33 acquires information related to an image displayed on each of the overlap regions of the display screen 21. The acquired information includes information related to a displayed image and displayed data (a document file, for example), and information related to displayed application software. The acquired information is transmitted together with identification information of each region to the instruction unit 34.

In accordance with the exemplary embodiment, if an icon representing a storage unit that stores data is displayed on the display screen 21, the data stored on the storage unit is acquired as information displayed on the display screen 21.

The instruction unit 34 determines contents of the process-at-folding to be performed, in accordance with the size of each overlap region and contents of information displayed on each overlap region of the display screen 21. The instruction unit 34 transmits an instruction for the process-at-folding to each of the drawing unit 35, the power source controller 36, and the process execution unit 37.

The drawing unit 35 causes an image to be displayed on a specific region of the display screen 21 in response to the instruction from the instruction unit 34.

The power source controller 36 switches on or off the terminal apparatus 1 in response to the instruction from the instruction unit 34.

The process execution unit 37 moves data, outputs a print command of an image, or processes data using the application software in response to the instruction from the instruction unit 34.

The contents of the processes to be performed by the drawing unit 35, the power source controller 36, and the process execution unit 37 are described in detail below. Each of the instruction unit 34, the drawing unit 35, the power source controller 36, and the process execution unit 37 are an example of an executing unit.

The operation unit 22 is described in detail below.

Figure 5:
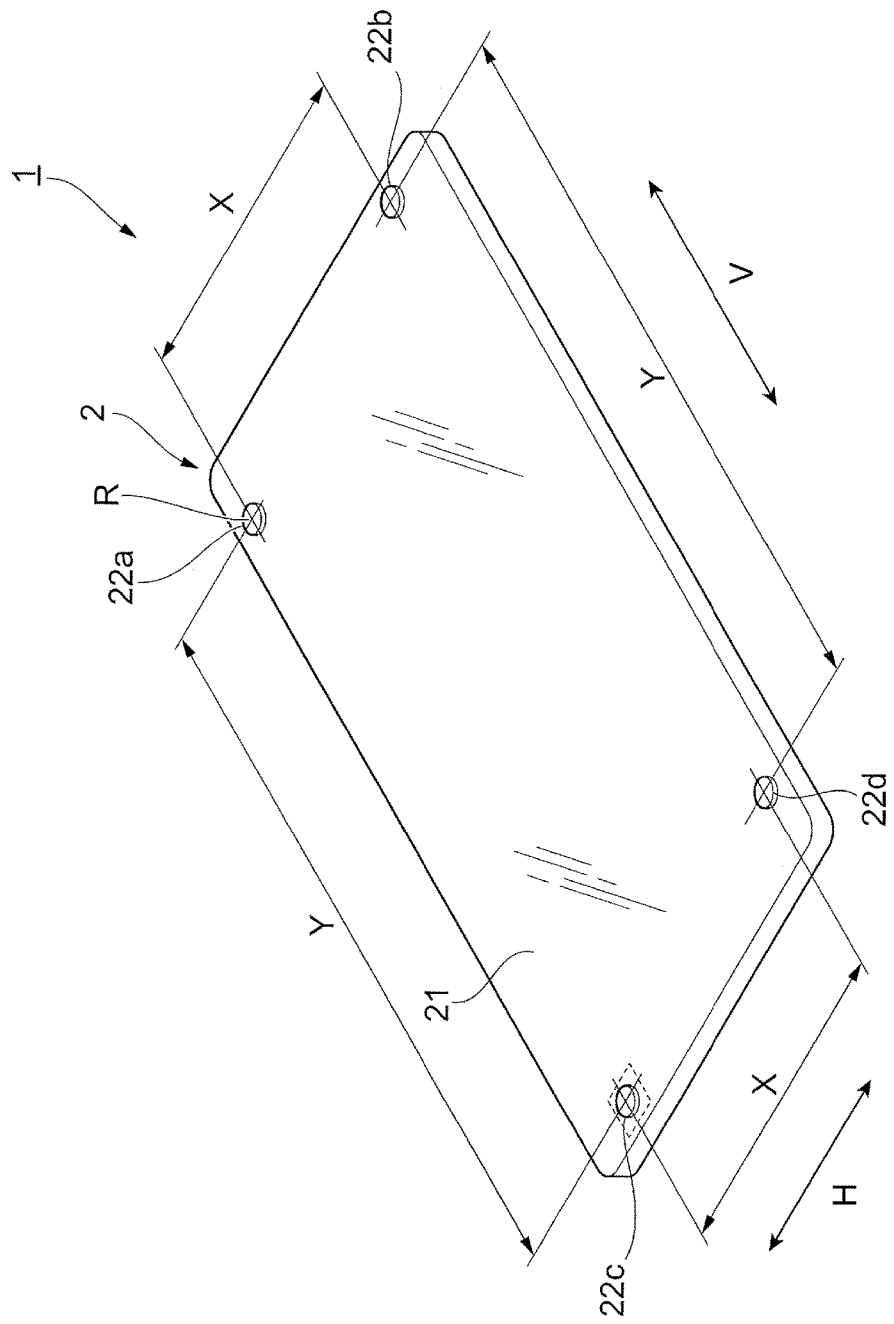
FIG. 5 illustrates a positional relationship of operation units in the terminal apparatus.

FIG. 5 illustrates a positional relationship of four operation units 22 in the terminal apparatus 1. In the discussion that follows, the four operation units 22 are respectively identified as a first operation unit 22a, a second operation unit 22b, a third operation unit 22c, and a fourth operation unit 22d.

The operation unit 22 has a circular shape and the surface area thereof is R.

The first operation unit 22a and the second operation unit 22b are arranged in a side portion along the side perpendicular to the vertical direction V of the display screen 21 (on the right short side of the display screen 21 in FIG. 5). The first operation unit 22a and the second operation unit 22b are not positionally aligned in terms of the vertical direction V. More specifically, the second operation unit 22b is arranged to be more outside in the vertical direction V of the display screen 21 than the first operation unit 22a.

The first operation unit 22a and the third operation unit 22c are arranged in a side portion along the side perpendicular to the horizontal direction H of the display screen 21 (on the left long side of the display screen 21 in FIG. 5). The first operation unit 22a and the third operation unit 22c are not positionally aligned in terms of the horizontal direction H. More specifically, the first operation unit 22a is arranged to be more outside in the horizontal direction H of the display screen 21 than the third operation unit 22c.

The second operation unit 22b and the fourth operation unit 22d are arranged in a side portion along the side perpendicular to the horizontal direction H of the display screen 21 (on the right long side of the display screen 21 in FIG. 5). The second operation unit 22b and the fourth operation unit 22d are not positionally aligned in terms of the horizontal direction H. More specifically, the fourth operation unit 22d is arranged to be more outside in the horizontal direction H of the display screen 21 than the second operation unit 22b.

The third operation unit 22c and the fourth operation unit 22d are arranged in a side portion along the side perpendicular to the vertical direction V of the display screen 21 (on the left short side of the display screen 21 in FIG. 5). The third operation unit 22c and the fourth operation unit 22d are not positionally aligned in terms of the vertical direction V. More specifically, the third operation unit 22c is arranged to be more outside in the vertical direction V of the display screen 21 than the fourth operation unit 22d.

Each of the distance between the first operation unit 22a and the second operation unit 22b and the distance between the third operation unit 22c and the fourth operation unit 22d is a distance X. Each of the distance between the first operation unit 22a and the third operation unit 22c and the distance between the second operation unit 22b and the fourth operation unit 22d is a distance Y. The distances X and Y has a relationship of the distance X<the distance Y.

A detection process of the overlap region of the display screen 21 is described below.

Figure 6A:
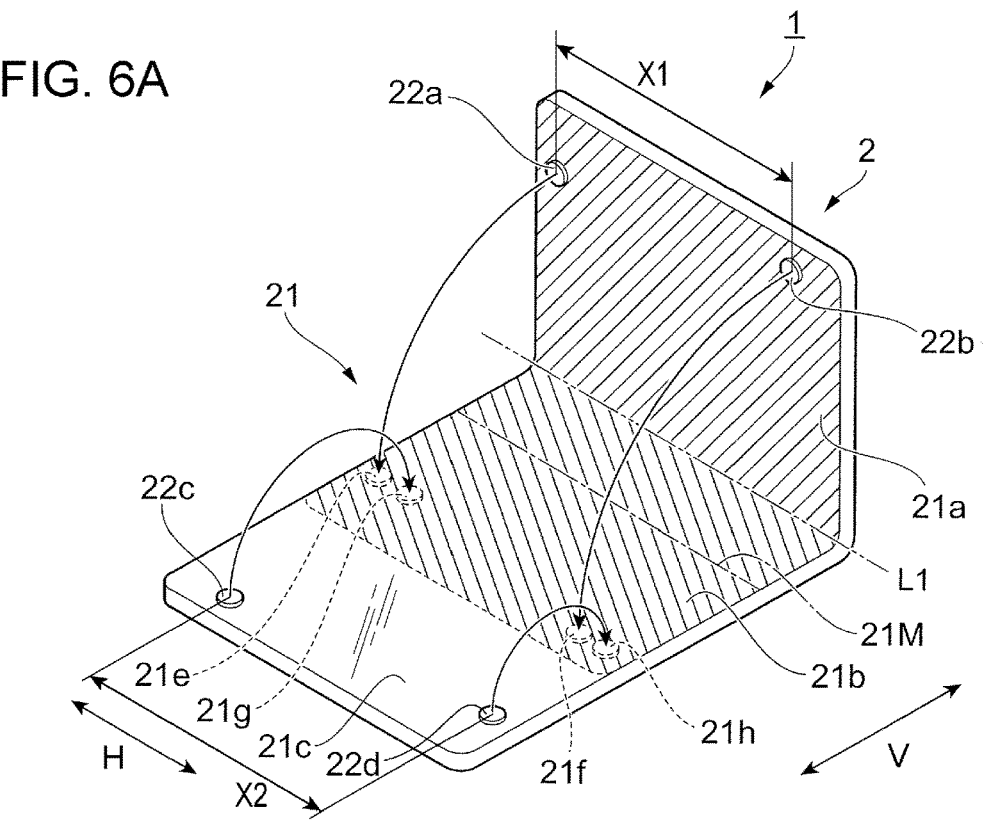
FIG. 6A and FIG. 6B illustrate an overlap region that is detected when a display screen is folded.
Figure 6B:
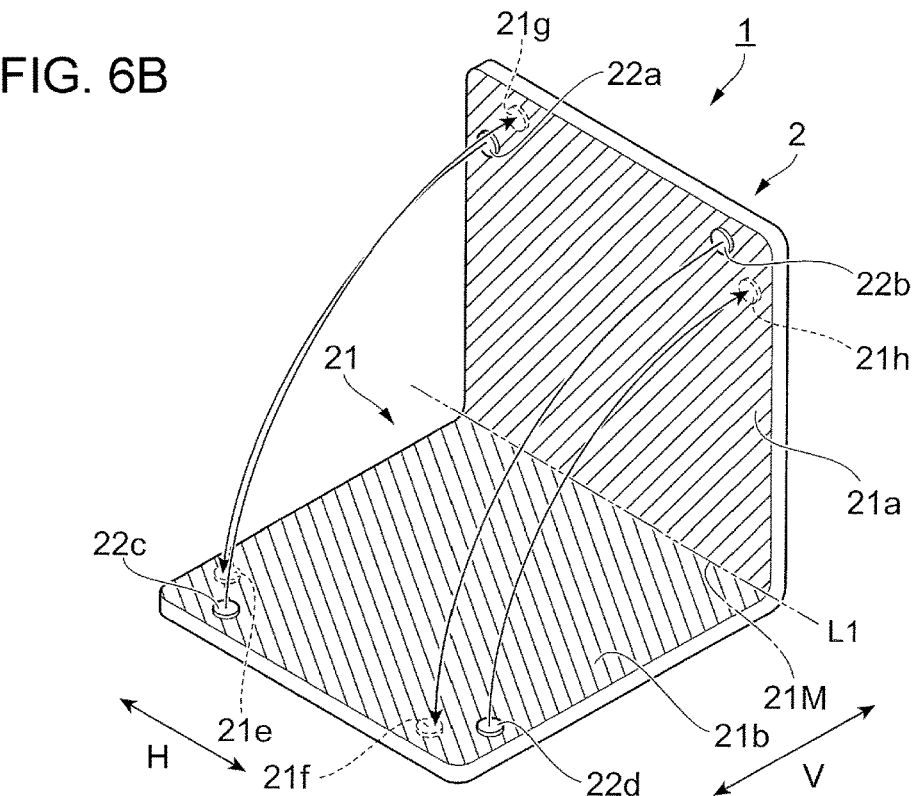

FIG. 6A and FIG. 6B illustrate regions that are to be detected as an overlap region of the display screen 21 when the display screen 21 is vertically folded.

Referring to FIG. 6A, if the display screen 21 is folded along the border line L1 serving a fold line that is more rightward than a center line 21M of the display screen 21 perpendicular to the vertical direction V thereof, the first operation unit 22*a* and the second operation unit 22*b* are pressed into contact with the display screen 21. The detecting unit 31 detects a first press-contact location 21*e* where the first operation unit 22*a* is pressed into contact with the display screen 21 and a second press-contact location 21*f* where the second operation unit 22*b* is pressed into contact with the display screen 21. The third operation unit 22*c* and the fourth operation unit 22*d* remain out of contact with the display screen 21.

The detecting unit 31 determines whether any of the four operation units 22 is pressed into contact with the display screen 21. If the display screen 21 is vertically folded such that the third operation unit 22*c* and the fourth operation unit 22*d* are pressed into contact with the display screen 21, a third press-contact location 21*g* of the third operation unit 22*c* is shifted rightward in the horizontal direction H from the first press-contact location 21*e* of the first operation unit 22*a*. A fourth press-contact location 21*h* of the fourth operation unit 22*d* is shifted rightward in the horizontal direction H from the second press-contact location 21*f* of the second operation unit 22*b*.

Based on the press-contact location of the operation unit 22, the detecting unit 31 thus determines which of the operation units 22 is pressed into contact with the display screen 21. In the example of FIG. 6A, based on the first press-contact location 21*e* and the second press-contact location 21*f* as the press-contact locations, the detecting unit 31 determines the first operation unit 22*a* and the second operation unit 22*b* of the operation units 22 are pressed into contact with the display screen 21.

The region calculating unit 32 calculates the overlap region of the display screen 21. More specifically, the region calculating unit 32 calculates, as the location of the border line L1, an intermediate location between the first operation unit 22*a* and the first press-contact location 21*e* and an intermediate location between the second operation unit 22*b* and the second press-contact location 21*f*.

The region calculating unit 32 calculates as an overlap region 21*a* expanding on the display screen 21 from the border line L1 to the edge of the side portion including the first operation unit 22*a* and the second operation unit 22*b*. The region calculating unit 32 calculates as an overlap region 21*b* a region expanding on the display screen 21 from the border line L1 and facing the overlap region 21*a*. The overlap region 21*a* equals the overlap region 21*b* in area. The region calculating unit 32 also detects a non-overlap region 21*c* of the display screen 21 in accordance with the overlap region 21*a* and the overlap region 21*b*.

If the display screen 21 is folded along the border line L1 as a fold line in a center line 21M perpendicular to the vertical direction V of the display screen 21 as illustrated in FIG. 6B, the first operation unit 22*a*, the second operation unit 22*b*, the third operation unit 22*c*, and the fourth operation unit 22*d* are pressed into contact with the display screen 21. The detecting unit 31 then detects the first press-contact location 21*e*, the second press-contact location 21*f*, the third press-contact location 21*g*, and the fourth press-contact location 21*h*.

The region calculating unit 32 calculates the location of the border line L1 in accordance with the first press-contact location 21*e*, the second press-contact location 21*f*, the third press-contact location 21*g*, and the fourth press-contact location 21*h*. The region calculating unit 32 calculates as the overlap region 21*a* the region of the display screen 21 expanding from the border line L1 to the edge of the side portion including the first operation unit 22*a* and the second operation unit 22*b*. The region calculating unit 32 calculates as the overlap region 21*b* the region of the display screen 21 expanding from the border line L1 and facing the overlap region 21*a*. Referring to FIG. 6B, there is no non-overlap portion in the display screen 21.

In the examples of FIG. 6A and FIG. 6B, the display screen 21 is vertically folded along the border line L1 serving as a fold line in parallel with the horizontal direction H. More specifically, when the display screen 21 is vertically folded, one end of the fold line is not shifted from the other end of the fold line of the display screen 21 in the horizontal direction H. Based on the press-contact location of the operation unit 22, the detecting unit 31 identifies which of the operation units 22 is pressed into contact with the display screen 21.

The display screen 21 may be folded along a border line as a fold line that extending in a slant angle with reference to the horizontal direction H. More specifically, when the display screen 21 is folded, one end and the other end of the fold line may not be aligned in the horizontal direction H. When the terminal apparatus 1 that is folded in this way is used, the terminal apparatus 1 may have a distance X1 between the first operation unit 22*a* and the second operation unit 22*b* and a distance X2 between the third operation unit 22*c* and the fourth operation unit 22*d*. The distance X1 and the distance X2 may have a relationship of X1≠X2.

When the display screen 21 is vertically folded in this manner, the detecting unit 31 may identify which of the operation units 22 is pressed into contact with the display screen 21, in accordance with the distance between the press-contact locations.

In the examples of FIG. 6A and FIG. 6B, the overlap region that occurs when the display screen 21 is folded is described. Even if the display screen 21 is horizontally folded, the detecting unit 31 may detect the overlap region in a similar way.

The detection process when the display screen 21 is folded is described below.

Figure 7:
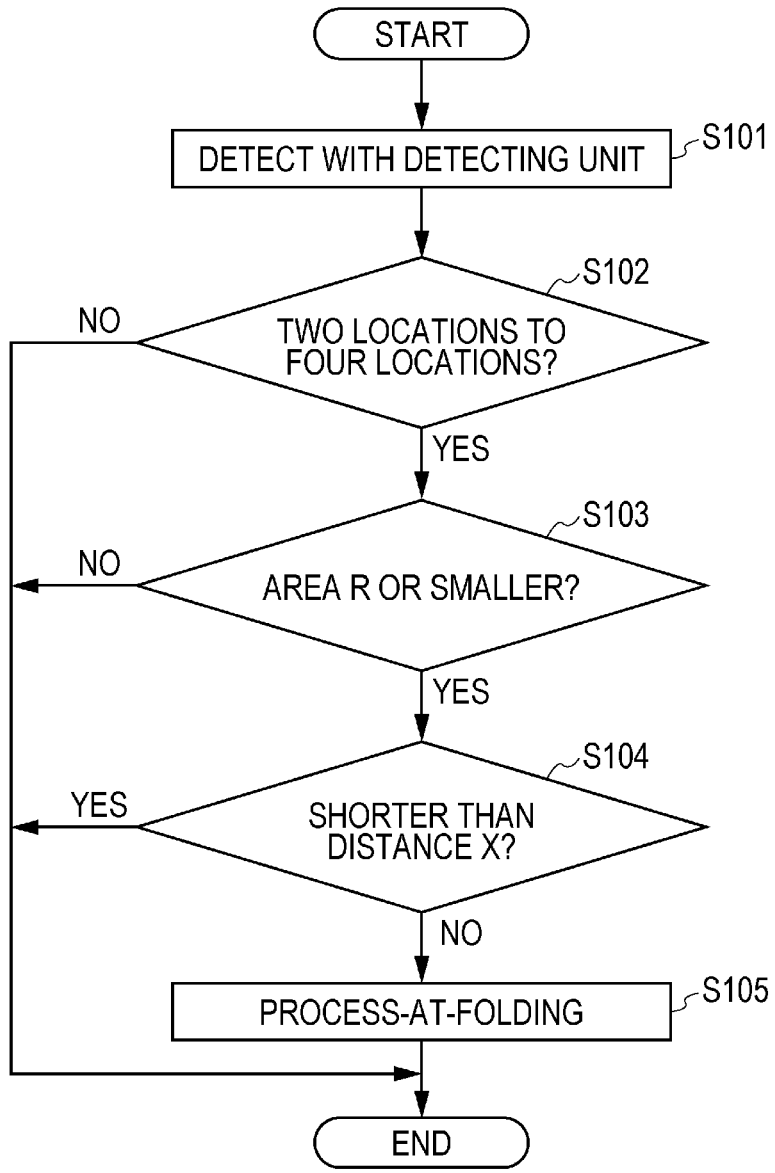
FIG. 7 is a flowchart illustrating a detection process performed when the display screen is folded.

FIG. 7 is a flowchart illustrating the detection process performed when the display screen 21 is folded.

When the display screen 21 is folded, the detecting unit 31 detects a portion that is in contact with the display screen 21 (step S101).

The detecting unit 31 determines whether the locations that are pressed into contact with the display screen 21 are 2 to 4 (step S102). If the locations that are pressed into contact with the display screen 21 is 1 or 5 or more (no branch from step S102), a user may directly press the display screen 21 rather than via the operation unit 22. In such a case, the detecting unit 31 does not determine that the operation unit 22 is pressed into contact with the display screen 21.

If the number of locations that are pressed into contact with the display screen 21 are 2 to 4 (yes branch from step S102), the detecting unit 31 determines whether the area of the press-contact region with the display screen 21 is equal to or below an area R (step S103). If there is a press-contact region larger than the area R (no branch in step S103), something other than the operation unit 22 (the user's finger, for example) may be pressed into contact with the display screen 21. In this case, as well, the detecting unit 31 does not determine that the operation unit 22 is pressed into contact with the display screen 21.

If the area of the press-contact portion of the display screen 21 is smaller than the area R (yes branch from step S103), processing proceeds to step S104. More specifically, the detecting unit 31 determines whether there is any spacing between the press-contact locations with the display screen 21 shorter than the distance X (step S104). If there is a spacing shorter than the distance X (yes branch from S104), something other than the operation unit 22 may be likely to be pressed into contact with the display screen 21. In such a case, as well, the detecting unit 31 does not determine that the operation unit 22 is pressed into contact with the display screen 21.

If there is no spacing shorter than the distance X (no branch from S104), the detecting unit 31 determines that the operation unit 22 is pressed into contact with the display screen 21.

The region calculating unit 32 then calculates the overlap region of the display screen 21. The region calculating unit 32 then performs the process-at-folding (step S105).

The process-at-folding is described below.

In the process-at-folding of the exemplary embodiment, each of an operation related to the image displaying on the display screen 21, an operation related to the power source of the terminal apparatus 1, an operation to move data, and an operation to run the application software is ready to be performed. The four operations may be performed concurrently or with one operation at a time.

Figure 8:
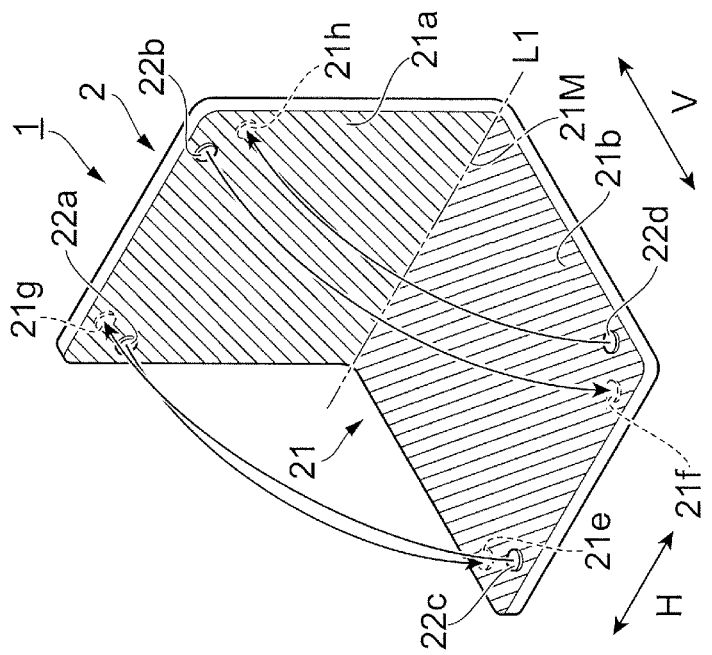
FIG. 8A and FIG. 8B illustrate an operation that is related to image displaying on a display screen in the process-at-folding.

FIG. 8A and FIG. 8B illustrate the operation that is related to the image displaying on the display screen 21 in the process-at-folding. In the examples of FIG. 8A and FIG. 8B, the operation related to the image displaying includes displaying an image on a non-overlap region of the display screen 21. On the other hand, the drawing unit 35 does not display any image on the overlap region of the display screen 21.

As illustrated in FIG. 8A, the display screen 21 is folded along the border line L1 as a fold line located more rightward than the center line 21M perpendicular to the vertical direction V of the display screen 21. The detecting unit 31 then detects the first press-contact location 21e and the second press-contact location 21f.

The region calculating unit 32 calculates the overlap region 21a and the overlap region 21b of the display screen 21 while also calculating the non-overlap region 21c of the display screen 21. The region calculating unit 32 then sends information related to the calculated regions to the instruction unit 34.

In response to the information acquired from the region calculating unit 32, the instruction unit 34 indicates to the drawing unit 35 the region of the display screen 21 where an image is to be displayed.

The drawing unit 35 displays an image G1 on the non-overlap region 21c of the display screen 21. On the other hand, the drawing unit 35 does not display any image on the overlap region 21a and the overlap region 21b of the display screen 21.

Referring to FIG. 8B, the display screen 21 is folded along the border line L1 as a fold line aligned with the center line 21M extending perpendicular to the vertical direction V of the display screen 21. The detecting unit 31 then detects the first press-contact location 21e, the second press-contact location 21f, the third press-contact location 21g, and the fourth press-contact location 21h.

The region calculating unit 32 calculates the overlap region 21a and the overlap region 21b of the display screen 21. As a result of the calculation, the region calculating unit 32 identifies that the display screen 21 does not have any non-overlap region. The region calculating unit 32 sends information related to the calculated regions to the instruction unit 34.

In response to the information acquired from the region calculating unit 32, the instruction unit 34 instructs the drawing unit 35 to display no image on the whole region of the display screen 21.

As a result, the drawing unit 35 does not display any image on the whole region of the display screen 21.

In accordance with the exemplary embodiment, in the process-at-folding, an image is displayed on the non-overlap region of the display screen 21 while no image is displayed on the overlap regions of the display screen 21. In other words, when the operation unit 22 acts on the display screen 21, the drawing unit 35 may or may not perform a display operation to display an image. More specifically, no image is displayed on the overlap regions of the surface of the display screen 21. In this way, the power consumption of the terminal apparatus 1 is reduced.

When the display screen 21 is folded, the user is unable to view the overlap regions of the display screen 21. If an image is displayed on the overlap region, the terminal apparatus 1 may consume more power.

In accordance with the exemplary embodiment in contrast, if no image is displayed on the overlap region of the display screen 21, power consumed to display the image on the overlap region is reduced.

The process-at-folding discussed with reference to FIG. 8A and FIG. 8B may be understood as the operation to move image data displayed on the overlap region 21a and the overlap region 21b.

Figure 9:
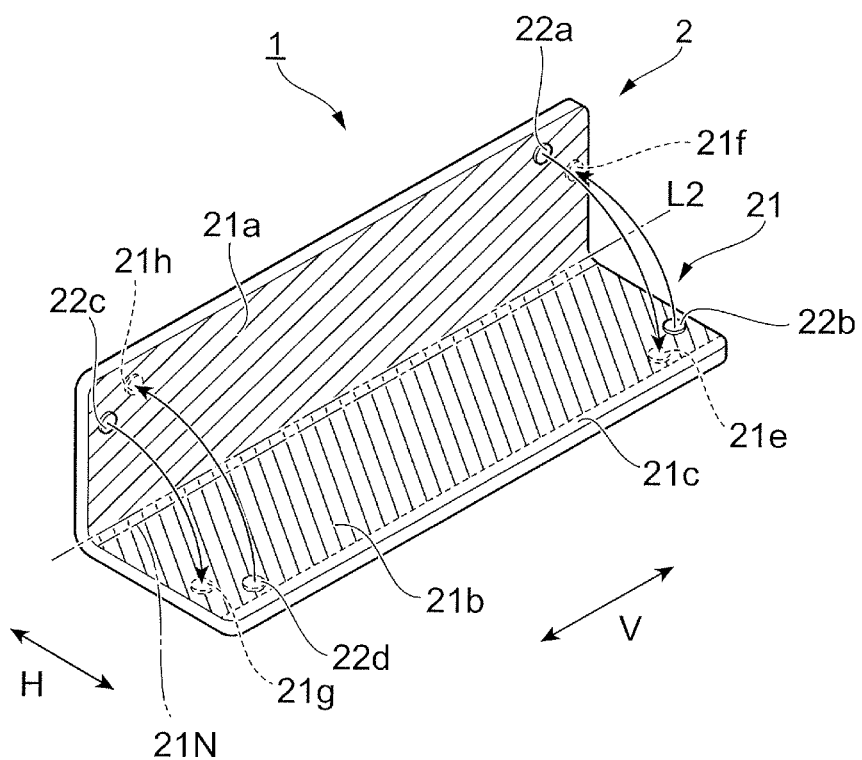
FIG. 9 illustrates an operation that is related to the image displaying on the display screen in the process-at-folding.

FIG. 9 illustrates an operation that is related to image displaying on the display screen 21 in the process-at-folding. In the example of FIG. 9, in the operation related to the image displaying, the whole region of the display screen 21 does not display any image when one end portion of the display screen 21 overlaps on the other end portion of the display screen 21.

Referring to FIG. 9, the display screen 21 is folded along the border line L2 as a fold line slightly more leftward than a center line 21N of the display screen 21 perpendicular to the horizontal direction H. The detecting unit 31 then detects the first press-contact location 21e, the second press-contact location 21f, the third press-contact location 21g, and the fourth press-contact location 21h.

The region calculating unit 32 calculates the overlap region 21a and the overlap region 21b of the display screen 21 while also calculating the non-overlap region 21c of the display screen 21. The region calculating unit 32 then sends information related to the calculated regions to the instruction unit 34.

In response to the information acquired from the region calculating unit 32, the instruction unit 34 instructs the drawing unit 35 to display no image on the whole region of the display screen 21.

As a result, the drawing unit 35 does not display any image on the whole region of the display screen 21.

In accordance with the exemplary embodiment, if the detecting unit 31 detects all the operation units 22 (the first operation unit 22a, the second operation unit 22b, the third operation unit 22c, and the fourth operation unit 22d) that are in contact with the display screen 21, no image is displayed on the whole region of the display screen 21. In other words, if one end portion overlapping the other end portion of the display screen 21 is detected, no image is displayed on the whole region of the display screen 21.

This arrangement restricts the displaying of an image on the display screen 21 the user has difficulty in viewing.

If there is a non-overlap region present on the display screen 21 with all the operation units 22 pressed into contact with the display screen 21, the area of that non-overlap region is small. If an image is displayed on that non-overlap region, the user may have difficulty in viewing the image. If an image is displayed on that non-overlap region, the power consumption of the terminal apparatus 1 may increase.

In accordance with the exemplary embodiment, if all the operation units 22 are pressed into contact with the operation unit 22, no image is displayed on the display screen 21. This arrangement thus restricts the displaying of an image on the display screen 21 the user has difficulty in viewing. The terminal apparatus 1 thus consumes less power.

In accordance with the exemplary embodiment, no image is displayed on the whole region of the display screen 21 when the one region of the display screen 21 overlaps the other region as illustrated in FIG. 8B or when all the operation units 22 are pressed into contact with the display screen 21 as illustrated in FIG. 9. In such a case, the power source controller 36 may switch off the terminal apparatus 1. In this way, the power-off of the terminal apparatus 1 is triggered if the terminal apparatus 1 is not viewed by the user.

Figure 10A:
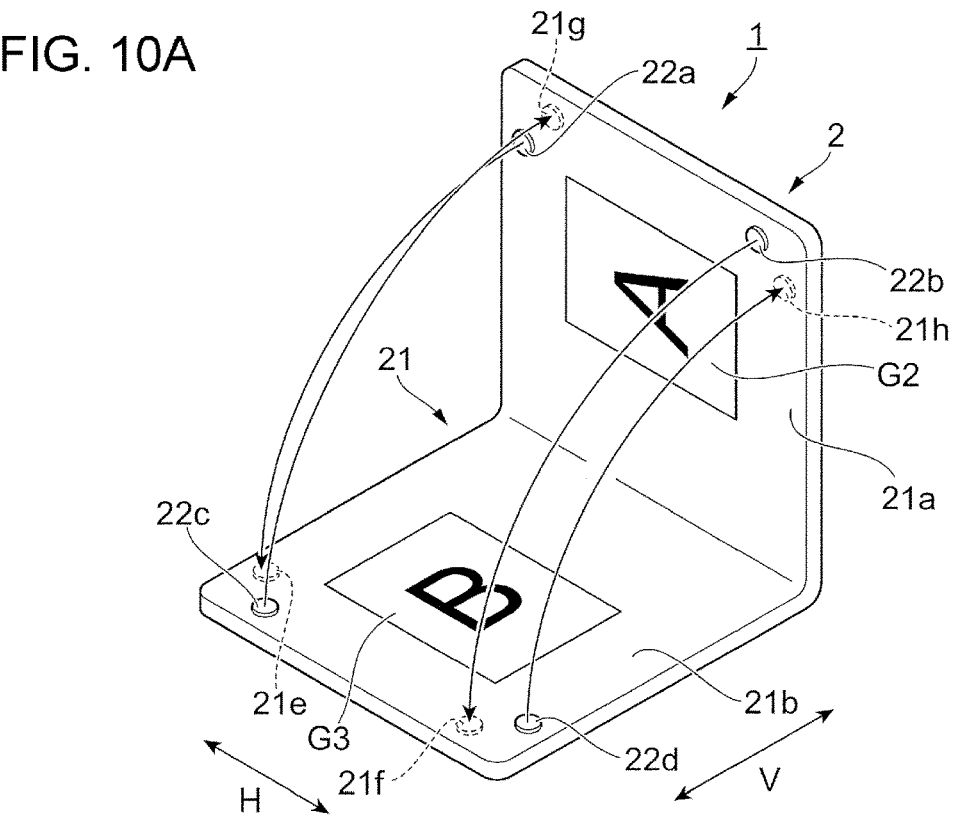
FIG. 10A and FIG. 10B illustrate an operation that is related to the image displaying on the display screen in the process-at-folding.
Figure 10B:
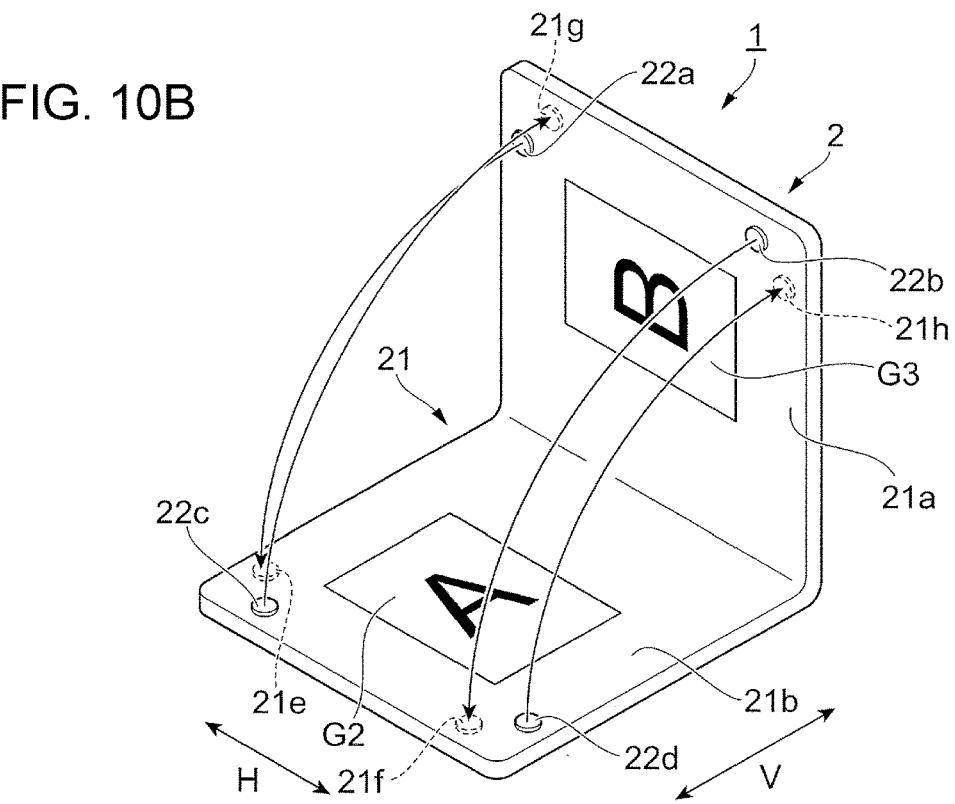

FIG. 10A and FIG. 10B illustrate an operation that is related to image displaying on the display screen 21 in the process-at-folding. In the examples of FIG. 10A and FIG. 10B, when the display screen 21 is folded, the operation related to the image displaying switches between an image displayed on one region of the display screen 21 and an image displayed on the other region of the display screen 21. More specifically, a first overlap region of the display screen 21 having a first image displayed thereon may be folded over a second overlap region of the display screen 21 having a second image displayed thereon. In this case, the second image is displayed on the first overlap region of the display screen 21, and the first image is displayed on the second overlap region of the display screen 21.

As illustrated in FIG. 10A, an image G2 is displayed on the far side in the vertical direction V of the display screen 21. An image G3 is displayed on the near side of the display screen 21.

When the display screen 21 is folded, the detecting unit 31 detects the press-contact locations of the operation units 22. The region calculating unit 32 then calculates the overlap region 21a and the overlap region 21b of the display screen 21. The region calculating unit 32 sends information related to the calculated overlap region 21a and overlap region 21b to the display information calculating unit 33.

The display information calculating unit 33 acquires information concerning the images displayed on the overlap region 21a and the overlap region 21b of the display screen 21. More specifically, the display information calculating unit 33 acquires information that the image G2 is displayed on the overlap region 21a. The display information calculating unit 33 also acquires information that the image G3 is displayed on the overlap region 21b. The display information calculating unit 33 sends to the instruction unit 34 the acquired information together with identification information of the overlap region 21a and the overlap region 21b.

In response to the information acquired from the display information calculating unit 33, the instruction unit 34 instructs the drawing unit 35 to display the images on the overlap region 21a and the overlap region 21b.

In response to the instruction from the instruction unit 34, the drawing unit 35 displays the image G3 on the overlap region 21a as illustrated in FIG. 10B. The drawing unit 35 also displays the image G2 on the overlap region 21b.

In accordance with the exemplary embodiment, before the display screen 21 is folded, the process-at-folding switches between the image displayed on the overlap region 21a and the image displayed on the overlap region 21b. In this way, the switching between the image G2 and the image G3 is performed by a user's intuitive operation (an operation to cause the region of the display screen 21 having the image G2 displayed thereon to be in contact with the region having the image G3 displayed thereon).

In the examples of FIG. 10A and FIG. 10B, the process-at-folding may be to print the image G2 displayed on the overlap region 21a of the display screen 21 and the image G3 displayed on the overlap region 21b. In this case, in response to the information acquired from the display information calculating unit 33, the instruction unit 34 instructs the process execution unit 37 to print the image G2 displayed on the overlap region 21a and the image G3 displayed on the overlap region 21b.

In response to the instruction from the instruction unit 34, the process execution unit 37 outputs a print command to an image forming apparatus (not illustrated) connected to the terminal apparatus 1 via a network. In this way, printing is performed by running the application software related to the image forming. The image displayed on the overlap region 21a and the image displayed on the overlap region 21b may be printed page by page, or collectively on a single page.

This arrangement frees the user from the operation to print the two images.

Figure 11A:
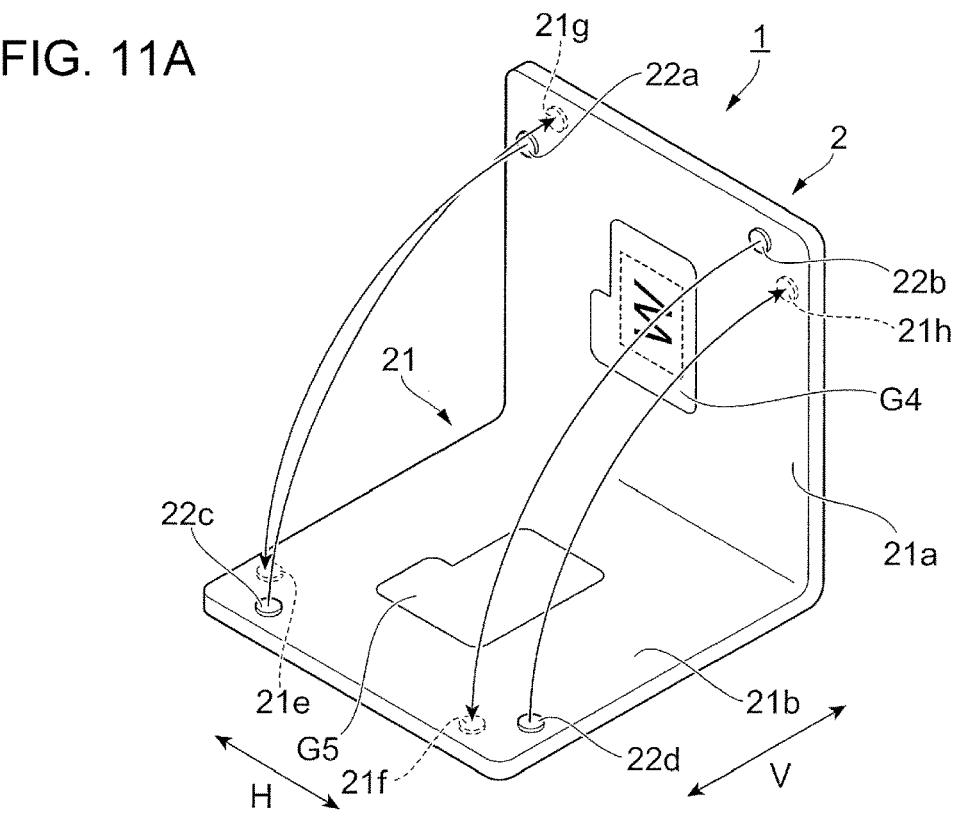
FIG. 11A and FIG. 11B illustrate an operation related to the movement of data in the process-at-folding.
Figure 11B:
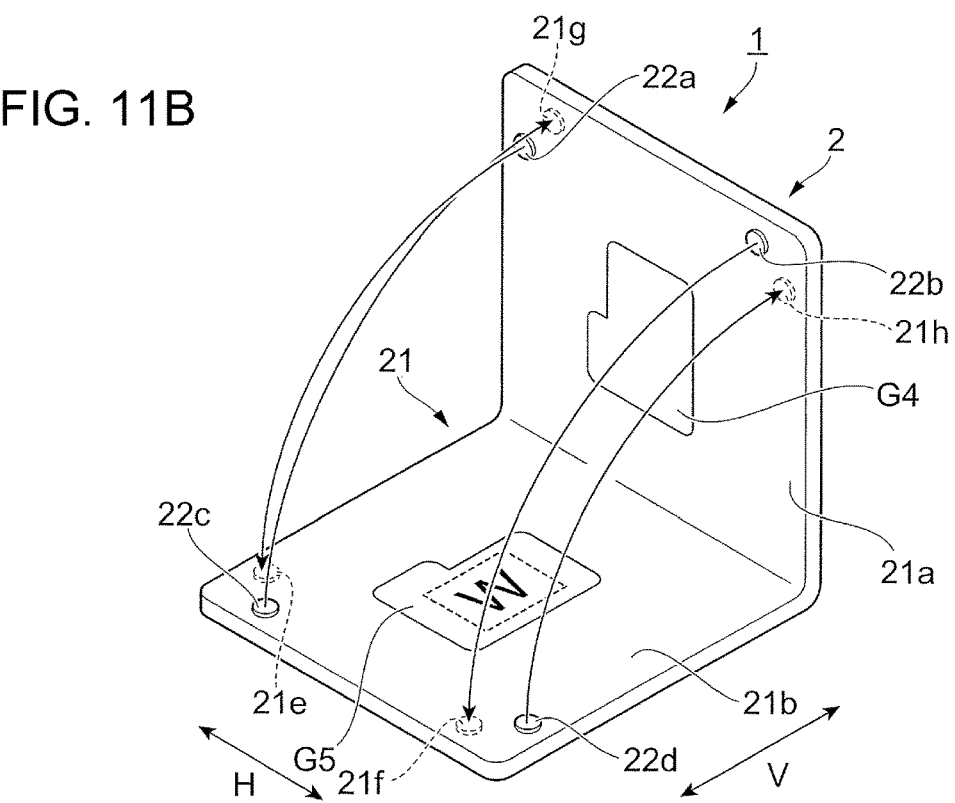

FIG. 11A and FIG. 11B illustrate an operation related to the movement of data in the process-at-folding. In the examples of FIG. 11A and FIG. 11B, the operation related to the movement of data switches storage units storing data. More specifically, if a first overlap region of the display screen 21 that displays a first storage unit overlaps a second overlap region of the display screen 21 that displays a second storage unit, the data stored on the second storage unit is stored onto the first storage unit.

Referring to FIG. 11A, an icon G4 representing a storage unit storing data (such as a document file) is displayed on a far side of the display screen 21 in the vertical direction V. The storage unit represented by the icon G4 stores the document file.

On the other side, an icon G5 representing a storage unit is displayed on a near side of the display screen 21 in the vertical direction V. The storage unit represented by the icon G5 stores no data.

When the display screen 21 is folded, the detecting unit 31 detects the press-contact locations of the operation units 22, and the region calculating unit 32 then calculates the overlap region 21a and the overlap region 21b of the display screen 21. The region calculating unit 32 then sends information concerning the calculated overlap region 21a and overlap region 21b to the display information calculating unit 33.

The display information calculating unit 33 acquires information related to an image displayed on each of the overlap region 21a and the overlap region 21b of the display screen 21. More specifically, the display information calculating unit 33 acquires information that the icon G4 is displayed on the overlap region 21a. The display information calculating unit 33 also acquires information that the storage unit represented by the icon G4 stores the document file. The display information calculating unit 33 further acquires information that the icon G5 is displayed on the overlap region 21*b*. The display information calculating unit 33 sends to the instruction unit 34 the acquired information together with the identification information of the overlap region 21*a* and the overlap region 21*b*.

The instruction unit 34 instructs the process execution unit 37 to switch between the storage units as targets storing the document files in response to the information acquired from the display information calculating unit 33.

In response to the instruction from the instruction unit 34, the process execution unit 37 moves the document file to the storage unit represented by the icon G5 as illustrated in FIG. 11B. As a result, the storage unit represented by the icon G4 stores no longer that file.

In accordance with the exemplary embodiment, the process-at-folding exchanges targets storing data (hereinafter referred to as target storage units), namely, switches between the storage unit displayed on the overlap region 21*a* and the storage unit displayed on the overlap region 21*b*. This arrangement reduces the number of operations the user performs to exchange the target storage units.

In order to exchange the target storage units, the user displays data (the icon representing the data) by opening the storage unit that stores the data, and then by exchanging the target storage units storing the data.

In accordance with the exemplary embodiment, the target storage units are exchanged by folding the display screen 21, and this helps the user skip an operation to open the storage unit that stores the data. The number of operations to be performed by the user to exchange the target storage units is thus reduced.

In the process-at-folding described with reference to FIG. 11A and FIG. 11B, the one storage unit displayed on the display screen 21 stores the data but the other storage unit does not store any data. If the two storage units store different data, the process-at-folding may cause the data on the one storage unit to be stored onto the other storage unit. In this case, the user specifies the target storage unit for the data in advance in the process-at-folding. Through the process-at-folding, the data stored on the one storage unit is stored onto the other storage unit specified by the user.

In the process-at-folding, a document file may be stored on the storage unit represented by the icon G5 and also a document file may be stored on the storage unit specified by the icon G4. Even if the storage unit represented by the icon G4 and/or the storage unit represented by the icon G5 is opened when the display screen 21 is folded, the document file may be moved. Even if the document file is opened when the display screen 21 is folded, the document file may be moved.

Figure 12A:
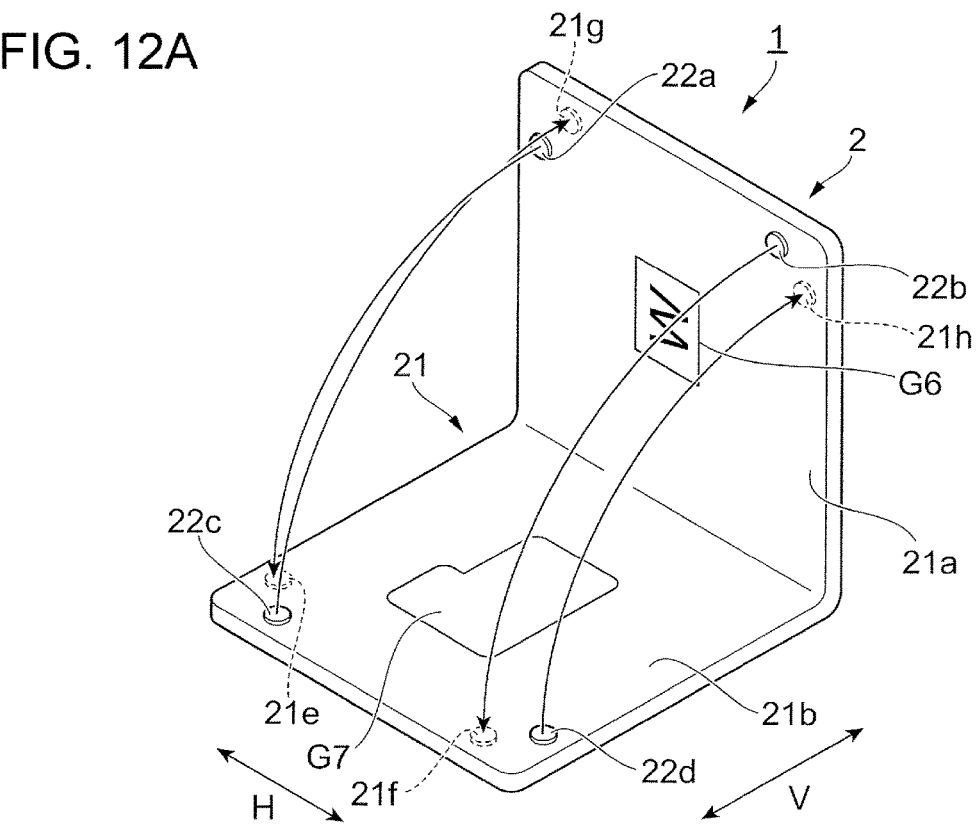
FIG. 12A and FIG. 12B illustrate an operation related to the movement of data in the process-at-folding.
Figure 12B:
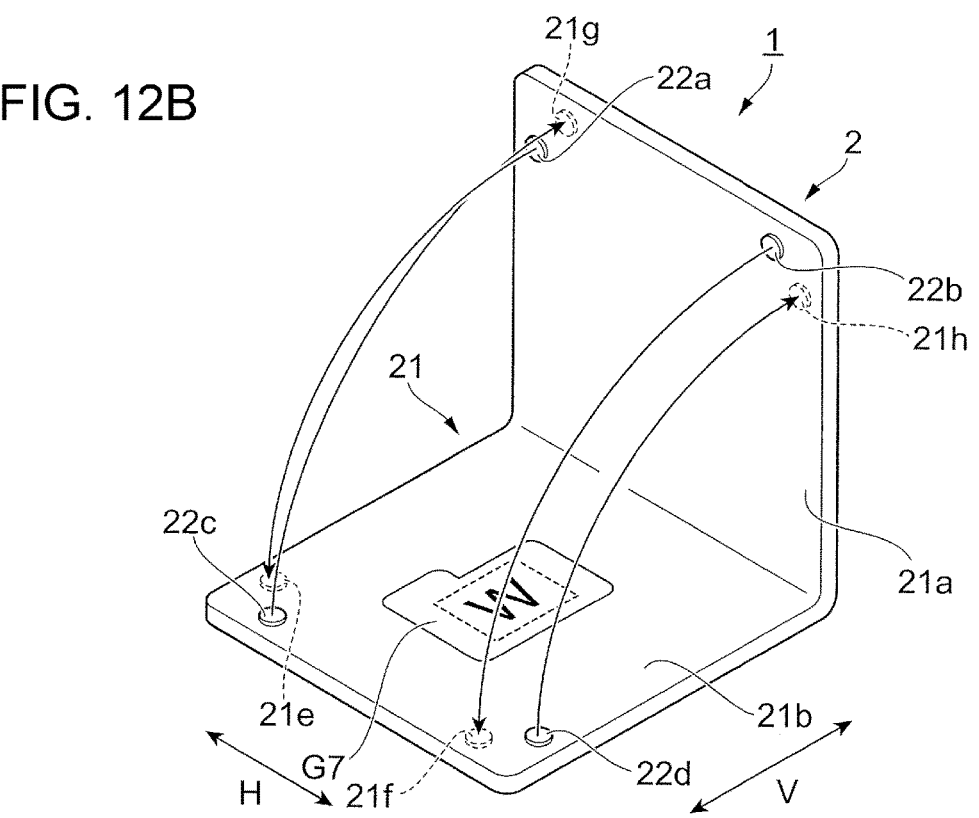

FIG. 12A and FIG. 12B illustrate an operation related to the movement of data in the process-at-folding. In the operation related to the movement data illustrated in FIG. 12A and FIG. 12B, data displayed on one overlap region of the display screen 21 is stored onto a storage unit displayed on the other overlap region. More specifically, if a first overlap region of the display screen 21 having the storage unit displayed thereon and storing the data is overlapped on a second overlap region of the display screen 21 having the data displayed thereon, the data displayed on the second overlap region is stored onto the storage unit.

Referring to FIG. 12A, an icon G6 representing a document file is displayed on a far side of the display screen 21. An icon G7 representing a storage unit is displayed on a near side of the display screen 21.

When the display screen 21 is vertically folded, the detecting unit 31 detects the press-contact locations of the operation units 22, and the region calculating unit 32 then calculates the overlap region 21*a* and the overlap region 21*b* of the display screen 21. The region calculating unit 32 sends to the display information calculating unit 33 information concerning the calculated overlap region 21*a* and overlap region 21*b*.

The display information calculating unit 33 acquires information concerning an image displayed on each of the overlap region 21*a* and the overlap region 21*b* of the display screen 21. More specifically, the display information calculating unit 33 acquires information that the icon G6 is displayed on the overlap region 21*a*. The display information calculating unit 33 also acquires information that the icon G7 is displayed on the overlap region 21*b*. The display information calculating unit 33 sends to the instruction unit 34 the acquired information together the identification information of the overlap region 21*a* and the overlap region 21*b*.

The instruction unit 34 instructs the process execution unit 37 to store the document file onto the storage unit in response to the information acquired from the display information calculating unit 33.

The process execution unit 37 moves the document file to the storage unit represented by the icon G7 in response to the instruction from the instruction unit 34 as illustrated in FIG. 12B. As a result, the icon G6 is no longer displayed on the overlap region 21*a*.

In accordance with the exemplary embodiment, in the process-at-folding, the data stored on the one overlap region is stored onto the other overlap region. In this way, the data is stored onto the storage unit in response to the user's intuitive operation (the operation to cause the region of the display screen 21 where the data is displayed to be in contact with the region where the storage unit is displayed).

When the display screen 21 is folded, the document file may be stored onto the storage unit even if the document is open on the overlap region 21*a* with the icon G6 not displayed.

Figure 13A:
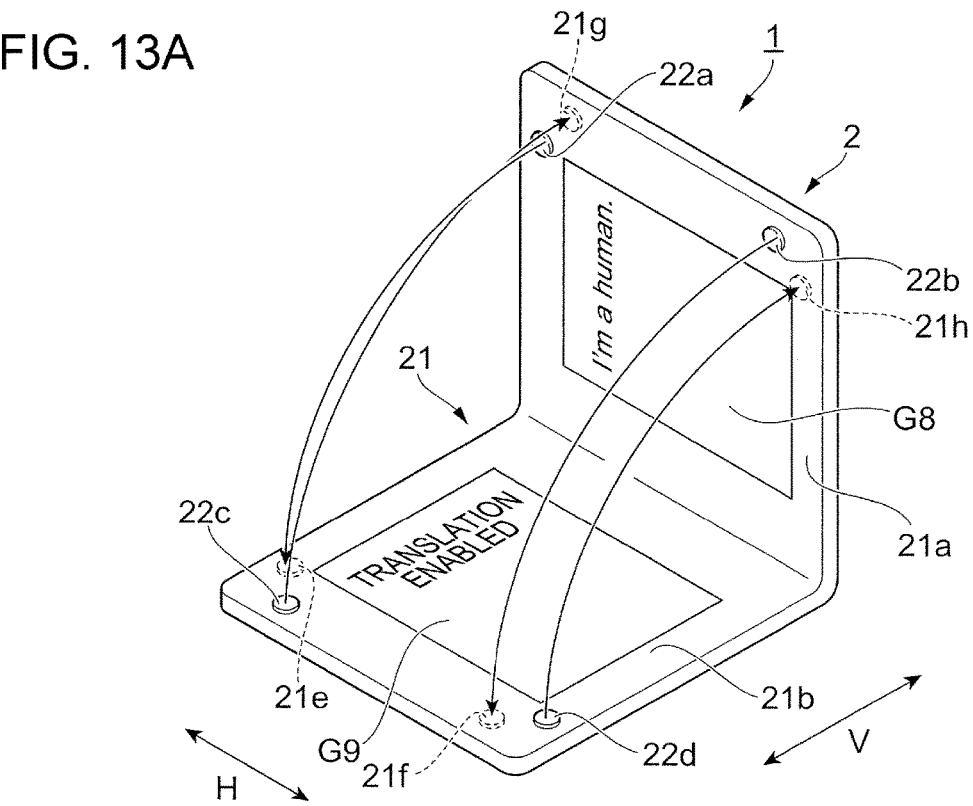
FIG. 13A and FIG. 13B illustrate an operation to run application software in the process-at-folding.
Figure 13B:
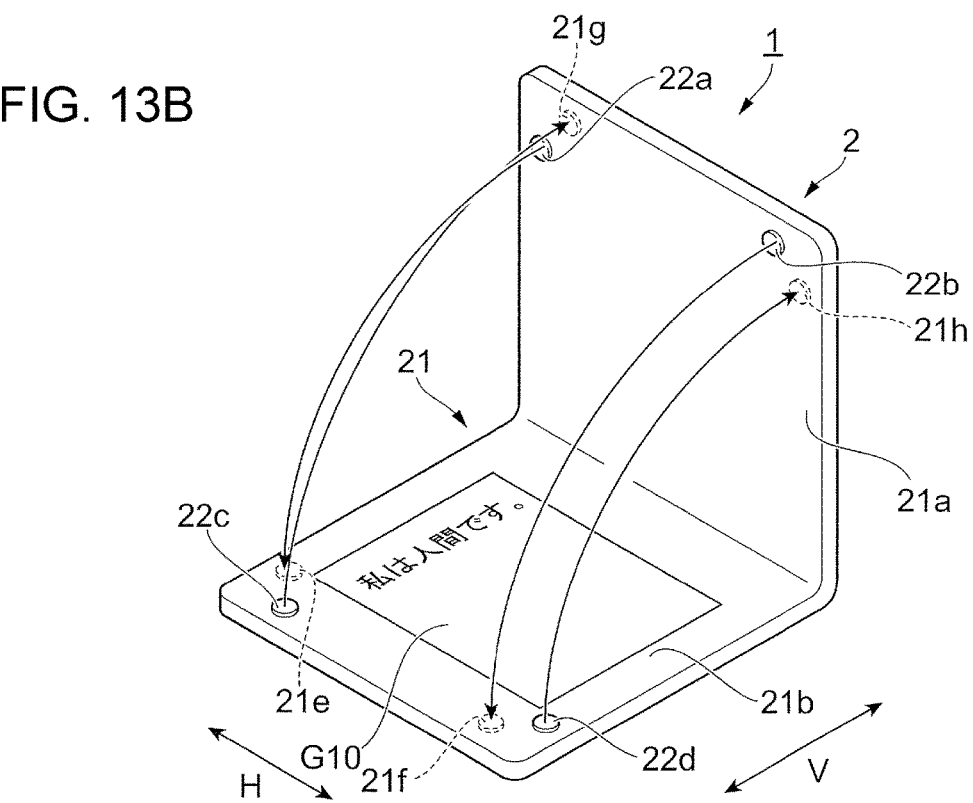

FIG. 13A and FIG. 13B illustrate an operation to run application software in the process-at-folding. In the examples of FIG. 13A and FIG. 13B, the operation to run the application software includes processing data displayed on the one region, using the application software displayed on the other region of the display screen 21. More specifically, if a first overlap region of the display screen 21 having data displayed thereon is overlapped on a second overlap region having a display concerning the application software, the data displayed on the first overlap region is processed using the application software.

Referring to FIG. 13A, an image G8 of an open file is displayed on a far side of the display screen 21 in the vertical direction V. More specifically, the image G8 of an English sentence reading "I'm a human" is displayed. An image G9 in which the application software that translates English is open is displayed on a near side of the display screen 21. More specifically, the image G9 indicating the translation enabled state of the application software is displayed.

When the display screen 21 is folded, the detecting unit 31 detects the press-contact locations of the operation units 22, and then the region calculating unit 32 calculates the overlapping region 21*a* and the overlapping region 21*b* of the display screen 21. The region calculating unit 32 transmits information concerning the calculated overlapping region 21*a* and overlapping region 21*b* to the display information calculating unit 33.

The display information calculating unit 33 acquires information related to an image displayed on each of the overlap region 21a and the overlap region 21b of the display screen 21. More specifically, the display information calculating unit 33 acquires information that the image G8 of the open document file is displayed on the overlap region 21a. The display information calculating unit 33 further acquires information that the image G9 of the open application software is displayed on the overlap region 21b. The display information calculating unit 33 transmits to the instruction unit 34 the acquired information together with the identification information of the overlap region 21a and the overlap region 21b.

In response to the information acquired from the display information calculating unit 33, the instruction unit 34 instructs the process execution unit 37 to process the document file using the application software.

In response to the instruction from the instruction unit 34, the process execution unit 37 translates the English document included in the document file using the application software. As a result, the image G10 of a translated document is displayed on the overlap region 21b as illustrated in FIG. 13B. More specifically, the image G10 on the overlap region 21b indicates that the English sentence "I am a human" in Japanese is "私は人間です。".

In accordance with the exemplary embodiment, using the application software displayed on the one region of the display screen 21, the data displayed on the other region is processed in the process-at-folding. The data is thus processed in response to the user's intuitive operation (the operation to cause the region of the display screen 21 where the application software is displayed to be in contact with the region where the data to be processed is displayed).

If an icon representing an open document file is displayed on the overlap region 21a with the image of the open document file not displayed, an operation to translate a document included in the document file may be performed in the process-at-folding. Furthermore, if an icon representing the application software is displayed on the overlap region 21b with the application software unopened, the data may be processed using the application software.

Referring to FIG. 10A through FIG. 13B, the process-at-folding with the display screen 21 vertically folded has been described. The process-at-folding may be similarly performed even with the display screen 21 horizontally folded.

The process-at-folding of FIG. 10A through FIG. 13B may be performed when no image is displayed on the overlap region with the display screen 21 folded.

In accordance with the exemplary embodiment, the predetermined process is performed with the surfaces of the screen overlap each other with the display screen 21 as the single screen folded. The display screen 21 may include two or more screens. For example, another screen may be formed and expand from a center line perpendicular to the vertical direction V of the display screen 21 between the one screen and the other screen. The display screen 21 may be then folded along any line perpendicular to the vertical direction V of the display screen 21.

In accordance with the exemplary embodiment, the display screen 21 is folded. Alternatively, the display screen 21 may be curved rather than folded. In such a case, as well, the process-at-folding may be performed if a press-contact of the operation unit 22 with the display screen 21 is detected.

In accordance with the exemplary embodiment, the four operation units 22 are arranged on the display screen 21. Alternatively, five or more operation units 22 may be arranged on the display screen 21.

Thee more operation units 22 may be arranged in an edge portion of the display screen 21 in addition to the four operation units 22 respectively arranged at the four corners of the display screen 21. The edge portion of the display screen 21 may overlap part of the display screen 21, and the three operation units 22 arranged in the edge portion are pressed into contact with the part of the region of the display screen 21. When the press-contact of the three operation units 22 is detected, the process-at-folding is performed. As a result, this arrangement may control a detection error that the display screen 21 is erroneously determined to be folded when the user touches the display screen 21 with two fingers.

As illustrated in FIG. 7, in accordance with the exemplary embodiment, one of the conditions that are to be satisfied to perform the process-at-folding is that two or more locations are pressed into contact with the display screen 21. Even if the number of locations that are pressed into contact with the display screen 21 is one, the process-at-folding may be performed.

In such a case, the surface areas of the first operation unit 22a, the second operation unit 22b, the third operation unit 22c, and the fourth operation unit 22d may be set to be different from each other.

In this arrangement, when the display screen 21 is folded, the detecting unit 31 determines which of the four operation units 22 is pressed into contact with the display screen 21, based on the surface area of the press-contact area with the display screen 21. The region calculating unit 32 calculates an overlap region of the display screen 21, based on the press-contact location of the identified operation unit 22.

In accordance with the exemplary embodiment, the process-at-folding is performed when the operation unit 22 is pressed into contact with the display screen 21. The operation unit 22 may not necessarily have to be arranged on the display screen 21. In such a case, for example, a photoreceptor that receives light may be mounted on the rear surface of the display screen 21. With this arrangement, when the display screen 21 is folded, light may be emitted from one region of the display screen 21, and the photoreceptor mounted on the other overlap region receives light. If an amount of light received by the photoreceptor is equal to or above a predetermined magnitude, the folding of the display screen 21 is detected, and then the process-at-folding is performed.

Figure 14:
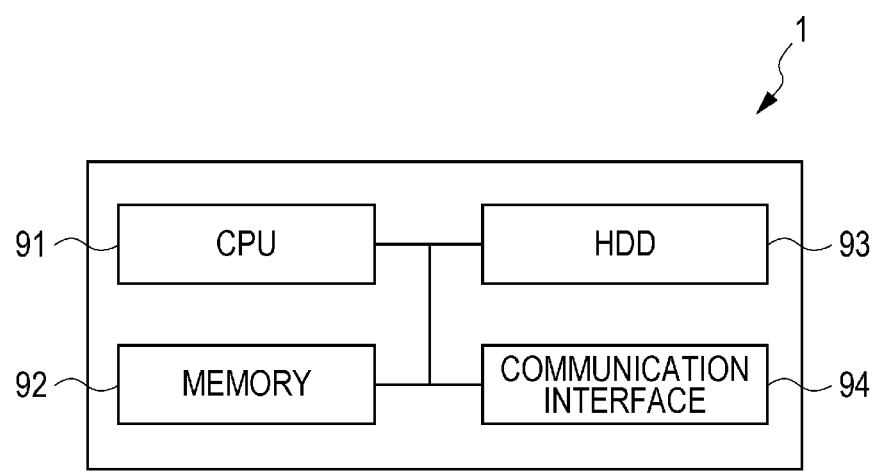
FIG. 14 illustrates a hardware configuration of the terminal apparatus.

FIG. 14 illustrates a hardware configuration of the terminal apparatus 1. The terminal apparatus 1 includes a central processing unit (CPU) 91, a memory 92, and a hard disk drive (HDD) 93. The CPU 91 executes a variety of programs including an operating system (OS), and application software. The memory 92 stores the variety of programs and data that is used to perform the programs. The HDD 93 stores data input to the programs or data output from the programs. The terminal apparatus 1 further includes a communication interface 94 for communication with the outside.

The process performed by the terminal apparatus 1 of the exemplary embodiment may be prepared as a program of application software.

The program implementing the exemplary embodiment may be supplied in a recorded state on a recording medium, such as a compact disk read-only memory (CD-ROM).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display apparatus comprising:
an image display configured to display a display screen that is transformable in shape at an arbitrary location;
a plurality of operation units provided at positions on a surface of the image display at distances away from edges of the image display; and
a controller configured to:
detect, in response to at least one operation unit from among the plurality of operation units contacting another position on the surface of the image display and based on a location of the another position, an overlap region where one region of the display screen, when transformed, overlaps another region of the display screen; and
perform a process in response to the controller having detected the overlap region between the one region and the other region of the display screen,
wherein the process includes, in response to the one region of the display screen displaying a first image and the another region of the display screen displaying a second image simultaneously, simultaneously displaying the first image on the another region and the second image on the one region,
wherein the overlap region is detected without being based on a shape of the at least one operation unit, and
wherein a number of the plurality of operation units is less than or equal to four.

2. The display apparatus according to claim 1, wherein in response to the display screen including a non-overlap region, the controller is configured to perform the process on the display screen with the non-overlap region included, or to perform the process on the display screen in a manner such that the overlap region is differentiated from the non-overlap region.

3. The display apparatus according to claim 2, wherein the controller is configured to perform the process by refraining from displaying an image on the display screen including the non-overlap region or by displaying the image on the non-overlap region without displaying the image on the overlap region.

4. The display apparatus according to claim 3, wherein in response to the controller having detected one end region of the display screen that overlaps another end region of the display screen, the controller is configured to refrain from displaying the image on the display screen.

5. The display apparatus according to claim 2, wherein in response to the controller having detected one end region of the display screen that overlaps another end region of the display screen, the controller is configured to refrain from displaying an image on the display screen.

6. The display apparatus according to claim 2, wherein in response to the controller having detected the one region having data displayed thereon being overlapped on the other region, the controller is configured to move the data to the other region.

7. The display apparatus according to claim 2, wherein in response to the controller having detected the one region having data displayed thereon being overlapped on the other region, the controller is configured to process the data using application software.

8. The display apparatus according to claim 1, wherein in response to the controller having detected one end region of the display screen that overlaps another end region of the display screen, the controller is configured to refrain from displaying an image on the display screen.

9. The display apparatus according to claim 1, wherein in response to the controller having detected the one region having data displayed thereon being overlapped on the other region, the controller is configured to move the data to the other region.

10. The display apparatus according to claim 1, wherein in response to the controller having detected the one region having data displayed thereon being overlapped on the other region, the controller is configured to process the data using application software.

11. The display apparatus according to claim 1, wherein the controller is configured to perform the process in response to both a first operation unit from among the plurality of operation units and a second operation unit from among the plurality of operation units contacting the surface of the image display.

12. The display apparatus according to claim 1,
wherein the process includes transmitting a print command to print an image displayed on the display screen.

13. The display apparatus according to claim 1,
wherein the process includes, in response to the one region of the display screen displaying a first image representing a first folder having data stored therein and the another region of the display screen displaying a second image representing a second folder, transferring the data from the first folder to the second folder.

14. The display apparatus according to claim 1,
wherein the process includes, in response to the one region of the display screen displaying a first image representing a file and the another region of the display screen displaying a second image representing a folder, storing the file in the folder.

15. The display apparatus according to claim 1,
wherein the process includes, in response to the one region of the display screen displaying a first image representing a file and the another region of the display screen displaying a second image representing application software, processing the file using the application software.

16. The display apparatus according to claim 1,
wherein the process includes, in response to the controller having detected one end region of the display screen that overlaps another end region of the display screen or the controller having detected all of the plurality of operation units contacting other positions on the surface of the image display, powering off the display apparatus.

17. A non-transitory computer readable medium storing a program causing a computer to perform a process for displaying an image, the process comprising:
displaying a display screen that is transformable in shape at an arbitrary location;
detecting, in response to at least one operation unit from among a plurality of operation units contacting a position on the surface of the display screen and based on a location of the position, an overlap region where one region of the display screen, when transformed, overlaps another region of the display screen, the at least one operation unit being provided at another position on the surface of the display screen at a distance away from edges of the display screen; and performing a process in response to the overlap region being detected between the one region and the other region of the display screen, wherein the process includes, in response to the one region of the display screen displaying a first image and the another region of the display screen displaying a second image simultaneously, simultaneously displaying the first image on the another region and the second image on the one region, wherein the overlay region is detected without being based on a shape of the at least one operation unit, and wherein a number of the plurality of operation units is less than or equal to four.

* * * * *